(12) United States Patent
Branch et al.

(10) Patent No.: US 11,477,509 B2
(45) Date of Patent: *Oct. 18, 2022

(54) IMMERSIVE COGNITIVE REALITY SYSTEM WITH REAL TIME SURROUNDING MEDIA

(71) Applicant: International Business Machines Corporation, Armonk, NY (US)

(72) Inventors: Joel W. Branch, New Haven, CT (US); Shang Qing Guo, Cortlandt Manor, NY (US); Jonathan Lenchner, North Salem, NY (US); Maharaj Mukherjee, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/789,891

(22) Filed: Feb. 13, 2020

(65) Prior Publication Data

US 2020/0186858 A1    Jun. 11, 2020

Related U.S. Application Data

(63) Continuation of application No. 14/825,649, filed on Aug. 13, 2015, now Pat. No. 10,609,438.

(51) Int. Cl.
*H04N 21/422* (2011.01)
*H04N 21/414* (2011.01)
(Continued)

(52) U.S. Cl.
CPC . *H04N 21/42203* (2013.01); *H04N 21/41407* (2013.01); *H04N 21/4223* (2013.01);
(Continued)

(58) Field of Classification Search
None
See application file for complete search history.

(56) References Cited

U.S. PATENT DOCUMENTS 4,965,844 A    10/1990 Oka
6,230,203 B1    5/2001 Koperda
(Continued)

OTHER PUBLICATIONS

IBM; Mobile Holographic Meeting Solutions; IP.Com; Oct. 26, 2010, pp. 1-4.

(Continued)

*Primary Examiner* — Alexander Q Huerta
(74) *Attorney, Agent, or Firm* — Anthony Curro, Esq.; McGinn I.P. Law Group, PLLC.

(57) ABSTRACT

An apparatus, method and system including a processor, a memory device accessible by the processor, and circuitry to selectively communicate with an on-the-go user device located at a location different from a location of the apparatus. The memory device stores instructions to permit the apparatus to selectively serve as an at-home user device that receives data from a wireless ad hoc network formed by sensors located within a link range of the circuitry of the on-the-go user device, data from the sensors of the wireless ad hoc network providing data for consumption by the at-home user device to permit an at-home user to be immersed in an experience of the location of the on-the-go user device.

20 Claims, 8 Drawing Sheets

(51) Int. Cl.
*H04N 21/4223* (2011.01)
*H04N 21/81* (2011.01)
*H04W 4/70* (2018.01)
*H04W 84/18* (2009.01)

(52) U.S. Cl.
CPC .......... *H04N 21/8146* (2013.01); *H04W 4/70* (2018.02); *H04W 84/18* (2013.01)

(56) References Cited

U.S. PATENT DOCUMENTS

| | | | |
|---|---|---|---|
| 7,502,152 B2 | 3/2009 | Lich et al. | |
| 8,270,767 B2* | 9/2012 | Park | G08B 13/19641 |
| | | | 382/284 |
| 8,717,405 B2* | 5/2014 | Li | H04N 13/243 |
| | | | 348/14.08 |
| 9,143,729 B2* | 9/2015 | Anand | H04N 7/152 |
| 9,591,260 B1* | 3/2017 | Inkpen Quinn | H04L 65/4069 |
| 2009/0013263 A1 | 1/2009 | Fortnow | |
| 2009/0051699 A1 | 2/2009 | Posa | |
| 2009/0201896 A1* | 8/2009 | Davis | H04W 84/18 |
| | | | 370/338 |
| 2010/0026809 A1 | 2/2010 | Curry | |
| 2010/0162297 A1 | 6/2010 | Lewis | |
| 2010/0194863 A1 | 8/2010 | Lopes | |
| 2011/0211096 A1 | 9/2011 | Aagaard | |
| 2011/0238751 A1 | 9/2011 | Belimpasakis | |
| 2012/0081503 A1* | 4/2012 | Leow | H04N 7/142 |
| | | | 348/14.07 |
| 2012/0133638 A1* | 5/2012 | Davison | G06T 19/00 |
| | | | 345/419 |
| 2012/0194547 A1 | 8/2012 | Johnson | |
| 2013/0102327 A1 | 4/2013 | Mate | |
| 2013/0242109 A1 | 9/2013 | van den Hengel | |
| 2013/0307997 A1 | 11/2013 | O'Keefe | |
| 2014/0267598 A1 | 9/2014 | Drouin et al. | |
| 2015/0032823 A1 | 1/2015 | Miller | |
| 2015/0127486 A1* | 5/2015 | Advani | H04L 65/4069 |
| | | | 705/26.41 |
| 2015/0248917 A1 | 9/2015 | Chang | |
| 2016/0027209 A1* | 1/2016 | Demirli | G06T 19/003 |
| | | | 345/419 |
| 2016/0100134 A1 | 4/2016 | Hinkel | |
| 2016/0205418 A1* | 7/2016 | Ho | H04N 21/23614 |
| | | | 725/109 |
| 2016/0277708 A1* | 9/2016 | Rintel | H04N 7/148 |
| 2017/0048592 A1* | 2/2017 | Branch | H04N 21/4223 |
| 2019/0149731 A1* | 5/2019 | Blazer | H04N 5/232935 |
| | | | 348/39 |

OTHER PUBLICATIONS

S. Wilson, "Understanding Image-Interpolation Techniques", VisionSystems Design at URL:www.vision-system.com/articles/print/volume-12/issue-10/departments/Wilsons-websites/understanding-image-interpolation.

United States Office Action dated Sep. 8, 2016 in U.S. Appl. No. 14/825,649.

United States Office Action dated Mar. 30, 2017 in U.S. Appl. No. 14/825,649.

United States Notice of Allowance dated Nov. 18, 2019 in U.S. Appl. No. 14/825,649.

* cited by examiner

IMMERSIVE COGNITIVE REALITY SYSTEM WITH REAL TIME SURROUNDING MEDIA

CROSS-REFERENCE TO RELATED APPLICATIONS

The present application is a Continuation Application of U.S. patent application Ser. No. 14/825,649, filed on Aug. 13, 2015, the entire contents of which are hereby incorporated by reference.

BACKGROUND

The present invention relates to virtual reality in real-time, and more specifically, providing real-time visual and/or auditory inputs to an at-home user from a remotely-located ad hoc network of sensors including cameras and/or microphones, as temporarily clustered together, by an on-the-go user's device, to form an ad hoc immersive session for the at-home user.

INTRODUCTION

Today, technology provides the ability to take photos or videos in extremely high resolution, but such media do not completely convey the experience of "being there" since one is not able to capture the view from all angles or capture sounds coming from all around. In a world with more and more I/O devices of all kinds around us, potentially providing more and more pixels for us to utilize, the present invention recognizes that it is possible to deliver a more immersive experience in real-time.

Various systems currently exist that provide a viewer with audio/visual signals from a selected remote location.

For example, telepresence conference rooms provide real time interaction in the audio visual domain whereby distant participants occupy the same audio-visual virtual space as local participants. However, such systems typically incorporate only a single camera angle. Moreover, these telepresence conference rooms work only when participants are in the specified rooms and do not even attempt to transmit the full audio/visual experience of the one group to the other group.

In such rooms, the user can participate using a laptop from home but cannot use an ad hoc set of machines, screens, and speakers that the user might have at home. Telepresence conference rooms use defined locations of cameras and microphones. All these locations are static and in any organization their numbers are usually limited to only a handful.

Conventional virtual reality systems create a cognitive environment, but the virtual reality is pre-stored and does not change based on the real life situation. Google Maps Street View, for example, provides a canned (pre-stored) view of a location with 360 degree viewing, but because the views of the scene are pre-stored the user does not have an experience of seeing what is actually unfolding at the location at the time when they are looking.

Another conventional system, the visual sensor network (VSN), is a network of spatially distributed smart camera devices capable of processing and fusing images of a scene from a variety of viewpoints into a form more useful than the individual images.

The present inventors have recognized that, as we get more and more interconnected, people feel compelled to interact audio-visually in as rich a fashion as possible, in real time. The present invention provides a solution to this newly-recognized need.

SUMMARY

According to exemplary embodiments of the present invention, which the present inventors herein describe as a "virtual teleporter", use is made of the ubiquitous presence of camera and microphone sensors, as currently available and becoming even more available over time, as interconnectable via an ad hoc sensor network at the input end. These sensors may be stationary or may change location or orientation over time depending upon the nature of each session and the different characteristics of each sensor in the sensor cluster. The number of sensors used in a virtual teleporter session can be relatively large compared with conventional methods, thereby providing image data that can selectively be fused, stitched, merged, and/or integrated together from multiple cameras to provide an immersive experience to the viewer in a virtual teleporter session.

Therefore, unlike existing approaches such as described above, the present invention recognizes that the large numbers of sensors, each associated with a computer chip so as to permit the sensor to join to and provide data into an ad hoc network, as becoming ever more available, can be utilized to provide visual and audio inputs from any angle. Together this sensor data provide a virtual teleporter that virtually immerses an "at-home" person in the sensory inputs from the remote location of another person, utilizing the at-home person's own visual and audio outputs (screens and speakers). The present invention requires no specialized sensors as used in prior art systems, and uses an ad hoc network of cameras and/or microphone sensors, meaning that the network is set up for the specific user session as a peer-to-peer network, with pixel and audio inputs from different sensors being added/deleted as the sensors potentially come into and go out of view during the session, due to motion of either the user or the sensor device, or the sensor device otherwise losing its connectivity with the ad hoc network. These sensors could be stationary or fixed, or they could be stationary and possibly moveable about one or more axes. The sensors could also be movable if mounted on a robot or other type of mechanism that could selectively change the location of the sensor.

Moreover, the present invention also does not require specialized hardware since it uses generically accessible audio/video sensors that merely need to be capable of publishing their data along with their geolocation information, plus rendering hardware of an at-home user that broadcasts its geolocation, and sensing hardware of the at-home user that can locate the user relative to the rendering hardware.

DETAILED DESCRIPTION

Figure 1:
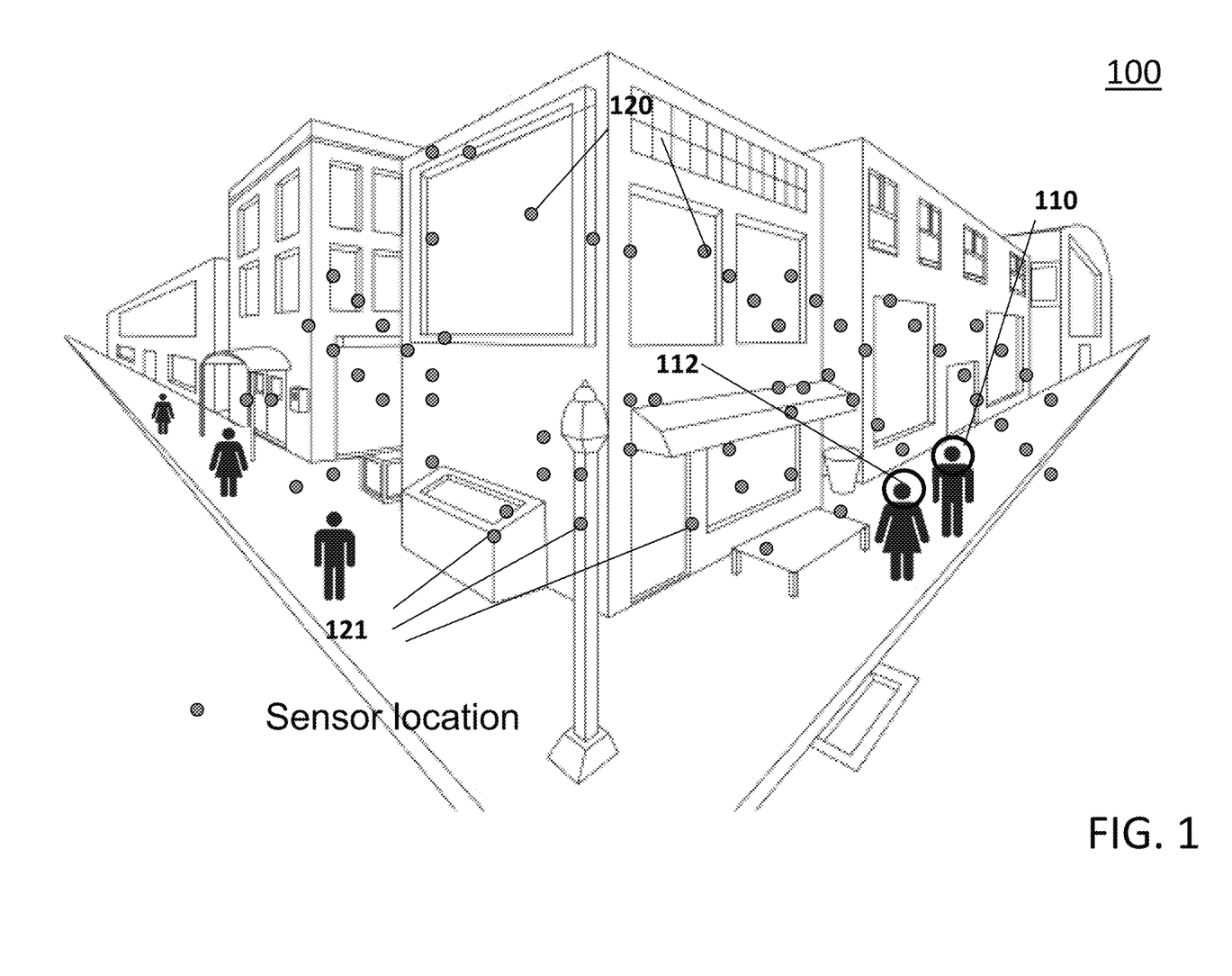
FIG. 1 shows a first exemplary scenario 100 that demonstrates the present invention.

Referring now to FIG. 1, the present invention is directed at recognizing that people often wish to interact audio-visually in real time, given that we are getting more and more interconnected. FIG. 1 shows an exemplary first possible scenario 100 of such increased interconnectedness made possible by the present invention, as involving personal engagements. In this example 100, a husband 110 goes to Paris on business and would like to interact with his wife remaining at their apartment in New York. He calls his wife and says "I am sitting in a roadside café on the Champs-Elysees. Why don't you come and join me here?"

His wife 112 uses the virtual teleporter of the present invention to join her husband virtually, in the seat next to him. She sees and listens, in real-time, to the people strolling down the Champs-Elysees, watches fireworks in the sky above, even converses with him at the same time, and can stroll at his side along a street in Paris, based on movements of her husband's smart phone during the session, as he walks away from the cafe. Such movement during a virtual teleporter session might require that different sensors 120, 121 be added/deleted from the session's ad hoc cluster of sensors. In this scenario, the husband 110 is the "on-the-go" user and his wife 112 is the "at-home" user.

Thus, in the context of the present invention, the term "on-the-go user" refers to the role of a user who is typically moving or in some interesting or unusual place, and whose system is establishing and maintaining an ad hoc network of sensors within a wireless link range of the on-the-go user role, and the term "at-home user" refers to the user who is typically at some other location from the "on-the-go user," perhaps at home, and whose system is consuming the video and audio data provided by the ad hoc network orchestrated by the system associated with the "on-the-go user".

In an exemplary and quite different second scenario, a combatant in a war zone is looking for a target. He is a sharpshooter with training in desert combat, but the war is happening in a tropical forest. He could use help from another combatant sharpshooter who knows more about tropical warfare. But at this moment his potential advisor/assistant is thousands of miles away. The person in the war zone calls his sharpshooter buddy for help, who then uses the virtual teleporter to virtually join his desert comrade and provide advice in real-time, based on video available from, for example, a camera mounted on the combatant's helmet and/or clothing and/or possibly from cameras mounted on drone aircraft circling the area, or on remotely-controlled or autonomous robots moving around in the vicinity. The present invention would permit the two sharpshooters to converse together, as the "at-home" sharpshooter explores the landscape from different locations and perspectives, providing comments and observations to his desert-trained comrade, who is the on-the-go user in this scenario.

In a third exemplary scenario involving sports and entertainment, assume that two long-time rivals have qualified for this year's Super Bowl. The organizers expect a great demand for tickets but, unfortunately, they cannot accommodate the anticipated number of people in the designated stadium. This scenario might create not only quite a few unsatisfied customers but also a big black market of tickets and counterfeit tickets. To prevent such pandemonium, the organizers offer many potential spectators access to a virtual teleporter session so they can be virtually present at the game, each able to view the game and environment at their own personal viewing angle and perspective.

Note that this third scenario would mean that there are multiple at-home users simultaneously using data from different sensors in the ballpark. Additionally, in this scenario, the on-the-go device(s) that set up the multiple virtual teleporter sessions as on-the-go user(s) could be one or more portable smart device(s) carried by one or more individuals representing the organizers, or could be stationary or semi-stationary devices positioned throughout the ballpark, in the stands, on a light pole, or elsewhere. Typically, in a large sports arena, there could potentially be many cameras and viewing angles that could be fused together to potentially render an infinite number of viewing angles for at-home viewers, if one or more on-the-go user devices are present to set up an ad hoc network to cluster together groups of cameras from different areas of the arena, or possibly all of them together.

The selection of video/audio to be presented at the at-home user's end from the ad hoc network data would depend upon the location and viewing perspective chosen by the at-home user, which the at-home user could change at will during the session. If the video/audio from the game is recorded, then the virtual teleporter would provide opportunities for re-runs viewed from different locations and perspectives within the ad hoc data, including potential to possibly even view the game from the field of play itself.

In a fourth exemplary scenario, a user, e.g. a skier or mountain climber, wears several cameras with microphones on her helmet, capturing the view in all directions as she skis or climbs. The views and sounds from the multiple cameras and mics are synthesized into a three-dimension (3D) mosaic with surround-sound, and transmitted as a single multi-facted media item, either after the fact, if stored, or via real-time streaming, assuming network connectivity is available. The recipient then plays the media item using whatever available I/O devices they have at their disposal. If only a high resolution front screen is available, it plays only on this screen, perhaps selected by the at-home user to present a panoramic view; if multiple screens are available, it plays on multiple screens, using the available screens and speakers to render views and sounds as faithfully as possible to the original experience, including surround views and sounds.

Thus, as exemplified in FIG. 1, and the first and third exemplary scenarios, the virtual teleporter of the present invention is enabled by the recent ubiquity of cameras and microphones, as well as the capability of forming ad hoc networks with sensor devices. The other two exemplary scenarios demonstrate how one or more cameras could be mounted on a participant and/or mobile vehicle(s) to permit formation of an ad hoc network of sensors, to enable remote or future viewing capability to users accessing the ad hoc sensor network data, either for real time viewing or for replaying the session from a memory device used to store the real time data.

In the context of the present invention, an ad hoc network refers to a decentralized network of devices interconnected, for example, using wireless peer-to-peer techniques, for the purpose of establishing a temporary, on-the-fly, collection of sensors for an immersive session by one or more at-home user devices. The present inventors have used ad hoc networking in other applications that are completely different in purpose from the virtual teleporter of the present invention.

For example, an ad hoc network is described in U.S. Pat. No. 8,988,218 B2, published on Mar. 24, 2015, entitled "Self-Detection of Lost Device Status Using Device-to-Device Communications with One or More Expected Neighboring Devices." This patent, incorporated herein by reference, describes how a device can itself detect when it is lost by monitoring whether it is located near expected neighboring devices. If expected neighboring devices are not detected within a preset threshold, the device will send a relay message to notify the owner of the device that it considers itself to be lost.

In U.S. Patent Application US 20140362710 A1, "Peer-to-peer ad hoc network system for monitoring a presence of members of a group" by Mukherjee, et al., filed on Jun. 5, 2013, and also incorporated herein by reference, a peer-to-peer ad hoc network is used to monitor presence of members of a group, each member carrying a locating device. As long as all members' locating devices are sensed as part of the peer-to-peer ad hoc network, all members are considered to be present. If one locating device loses contact with the ad hoc network, a location server will detect its absence and generate an alert. This second application uses the peer-to-peer ad hoc network to, for example, monitor presence of children on a field trip.

As explained in this pending patent application, each computer in a peer-to-peer computer network can act as a client or a server for the other computers in the network, allowing shared access to various resources such as files, peripherals, and sensors, without the need for a central server. Peer-to-peer networks can be set up within a home, a business, or over the Internet and require all computers in the peer-to-peer network to use the same or a compatible program to connect to each other and access files or other resources found on other computers. Peer-to-peer networks are currently commonly used to share context such as audio-video or data.

The present invention is, therefore, one more example of implementing and using an ad hoc network, as now used for purpose of providing a real time virtual session for an at-home user by providing video and audio signals from a remotely-located, peer-to-peer ad hoc network of video and audio sensors, as clustered together by a request to form the ad hoc network. If data from an ad hoc sensor network is stored in a memory, then at-home users would be able to experience any number of re-runs, including the possibility of changing locations in each re-run, thereby re-experiencing the data from a different perspective on each re-run.

In general, an "ad hoc network", or wireless ad hoc network (WANET) is intended herein to refer to a decentralized type of network that does not rely on a preexisting infrastructure, such as routers in wired networks or access points in conventional networks. Instead, each node potentially participates in routing by forwarding data for other nodes, so the determination of which nodes forward data is made dynamically on the basis of the ad hoc network connectivity, as different sensors potentially join or leave the network during the session. In addition to classic routing mechanisms and protocols, ad hoc networks can use flooding for forwarding data. In an ad hoc network all devices have equal status on the network for performing network functions and are free to associate with any other ad hoc network device within the network link range.

The present invention differs in various ways from conventional systems previously mentioned in the background section above.

First, the VSN and other existing prior art use a completely uniform set of sensors, such as a given kind of camera and network. In contrast, the present invention can use a completely non-uniform set of cameras interconnected by an ad hoc network, as long as the cameras can self-identify with their geographical location and can reveal characteristics such as resolution, etc, either by declaration or by simple presentation of their output data. Thus, the term "ad hoc", as used in the context of the present invention, also refers to the ability to intercommunicate with sensors, such as cameras and/or microphones, in the intended desired location, and the sensor is capable of identifying its location and orientation and can interact with an ad hoc network or other communication network for transmitting its output data.

Second, the present invention accommodates any output devices and does not require specialized glasses or goggles. Additionally, the present invention incorporates a method of learning for making personal adjustments to accommodate a user's special visual or auditory needs, such as peripheral vision enhancement, or to increase viewer comfort, a feature to be discussed in more detail later.

Figure 2:
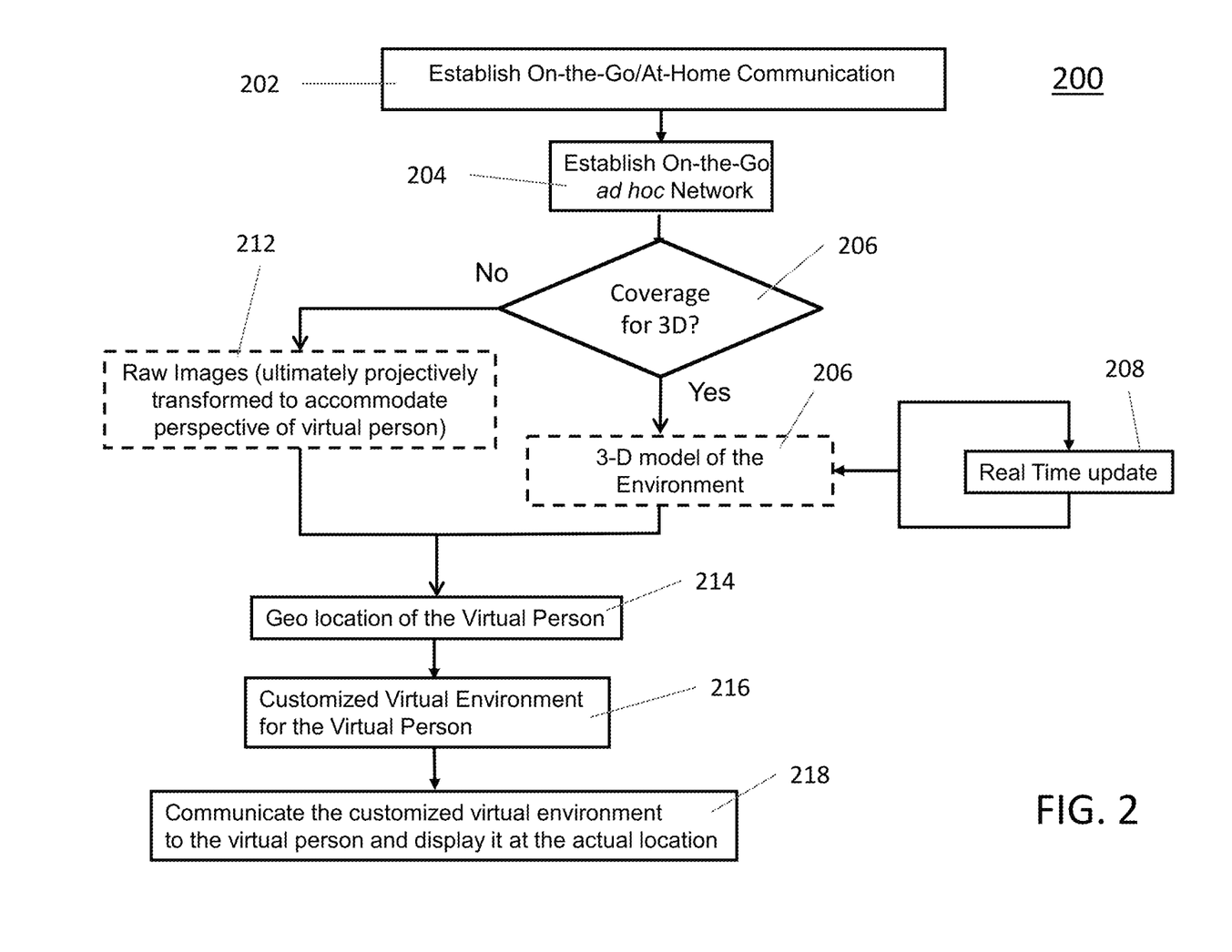
FIG. 2 shows an exemplary high-level flowchart format 200 of an exemplary method of the virtual teleporter system of the present invention.

FIG. 2 shows a high-level flowchart 200 of an exemplary method used in the present invention. In the first step 202, communication is established between the on-the-go user's device and the at-home user's device, using conventional connections such as telephone and/or internet technology, including possibly an internet tunnel between the two user devices, which could be, for example, two smart phones each with an app or application program that implements the present invention.

In second step 204, possibly at least partially concurrently with the first step 202, an ad hoc network is established at the on-the-go user's device with a plurality of cameras and possibly other sensors, such as microphones, at the on-the-go location, to thereby set up an ad hoc network including a cluster of sensors for a virtual teleporter session. Such ad hoc network could be established, for example, by transmitting a wireless peer-to-peer interconnection request between an app on the on-the-go user's device, to make contact with any sensor in the vicinity of the on-the-go user's device which is configured to participate in an ad hoc network as an input sensor and is within range of the ad hoc network request from the on-the-go user's device, e.g., within wireless link range. Such a sensor must be able to specifically identify the precise location and orientation for which its sensor data is provided since the at-home user will effectively be selecting which sensor(s) provide(s) data by selecting a location and viewing angle within the ad hoc data. It should be noted that more than one on-the-go user device might be involved in forming an ad hoc network, should there be more than one on-the-go user participating in the session. The ad hoc network of the present invention could be implemented using conventional techniques in Wi Fi and peer-to-peer technologies.

In one exemplary embodiment, when an activation request is made, the system/app detects all registered sensing devices in the area or sensors that it can detect as present and capable of forming a network and creates an ad hoc network with these sensors.

The on-the-go user's smart device can itself serve as a sensing device in the system. Each sensing device, including possibly the on-the-go user's smart device itself, can be part of one or more concurrent ad hoc networks, since each sensor would transmit its data concurrently to any on-the-go device located within its transmitting range. There can be multiple users using the same ad hoc network, since each at-home user selects a location and viewing perspective within the ad hoc network data. Sensors can come into and go out of the ad hoc network if/as the on-the-go user moves about, or the ad hoc network contact is otherwise lost or discontinued.

In step 206, the system determines whether coverage is sufficiently dense to provide data for 3D modeling of the view to be used during the session. Such 3D modeling is needed if the at-home user is to be given the ability to navigate within the scene. If 3D modeling is used, the average square meters of camera coverage should be approximately equal to the square of the virtual step size allowed within the model. Along this line, it is noted that only two cameras could provide binocular (stereoscopic) vision similar to having two eyes that provide binocular vision to humans, so that only two cameras in the ad hoc network at the on-the-go station would be sufficient to provide a degree of real-time immersion above that of most remote viewing technologies, if the at-home system can display binocular pixel data with, for example, goggles that receive different inputs. Similarly, two microphones could provide binaural audio during a virtual teleporter session. It should be clear that a 3D model would provide the at-home user with the opportunity for more immersion than simple binocular viewing or other means of viewing the raw data.

In step 208, video and audio data streams into the system from the remote sensors, either for the 3D modeling 210 or as raw image data 212 should 3D modeling not be possible. In step 214 the at-home user sets a geolocation of the desired virtual location, including not only intended geographical location relative to the sensors but also the orientation of the user, including direction of gaze, and possibly a location relative to the on-the-go user's device (e.g., three feet to one side of the on-the-go user).

In step 216, the system, typically at the at-home device, calculates a customized virtual environment for the virtual person and, in step 218, communicates the customized virtual environment to the display device(s) and speaker(s) of the session to the at-home user, which may have been set up as an ad hoc at-home network. The system either takes perspectively-accurate images from the 3D model or transforms the raw images by appropriate projective transformations. Color and resolutions are converted to render consistently to the at-home user. The system renders the audio input by estimating distance from the audio source at different frequencies and rendering a volume-wise consistent surround-sound experience. Calculations for such 3D modeling could occur in various locations in the system, including the on-the-go user's device, the at-home user's device, or in a server located somewhere remotely from either the on-the-go user device or the at-home device but somewhere along a path of the sensor data.

An on-the-go user of the present invention, such as the husband temporarily on assignment in Paris, can activate his or her system, for example, via an app on their smart device in conjunction with the camera, microphone, and speaker from the phone or from independent devices. In some embodiments, when the activation request is made the system/app automatically transmits a peer-to-peer request to all sensors in the neighborhood of the desired location that are available to participate in establishing an ad-hoc network.

In other embodiments, the sensors available in any location could be registered in a database, so that the on-the-go device could query and contact each sensor individually. Such a database of registered sensors at different specific locations could also include a registered stationary on-the-go device at each registered location, thereby providing "virtual" on-the-go user stations that would be available to at-home users. In this exemplary embodiment, a remotely-located server or even an at-home user's smart phone would contact appropriate sensors at a remote on-the-go location without having an actual person carrying an on-the-go device to form the ad hoc network at the on-the-go end. Instead, the at-home user would interact with an unmanned, on-the-go device located at the desired location that would provide the on-the-go user role on demand.

The smart device of the on-the-go user can itself be a sensing component of an ad hoc cluster of sensors, which would be useful particularly as a microphone/speaker for the husband/wife session in Paris described in the first exemplary scenario. Along this same line, it is noted that the present invention includes an embodiment in which one of the cameras and/or auditory sensors at a location, whether fixed or mounted on a mobile platform, is combined with a built-in capability to serve as an on-the-go device to initiate an ad hoc session on demand from an at-home user. This combination is similar to the husband's smart phone in scenario 1, that is capable of serving both as the on-the-go user's device as well as potentially providing additional sensor inputs as a camera and/or microphone, except that this embodiment also provides the additional feature of being able to receive remote requests from at-home users to establish an ad hoc sensor network and transmit the ad hoc data to the at-home user without having to rely upon a person being physically present at the on-the-go location.

Each sensing device, including possibly even the on-the-go user's smart device, can be at the same time part of one or more ad hoc networks. There can be multiple users using the same ad-hoc network. For example, the session described in the first scenario could also include one or more children of the husband/wife session in Paris, as either on-the-go or at-home participants. Additionally, other completely unrelated persons could be using the same sensors' data in Paris during the period that the husband/wife session is ongoing, and each session's participants would be unaware of other sessions, with each at-home user's device providing a customized view for each at-home user.

Additionally, in the present invention, as the on-the-go user moves in and out of a particular vicinity, local stationary sensors could join or leave the ongoing ad-hoc network. This is accomplished by appropriately maintaining and modifying the existing ad hoc network to add/delete sensors by, for example, conventional peer-to-peer wireless communication protocols. The on-the-go user's system of the present invention gathers audio and video from sensors in the network.

As mentioned, if the environment is rich enough in sensors, the system builds a 3D model of the desired location, thereby providing merging, rendering, and 3D modeling that would provide an immersion aspect for the user beyond that possible by conventional systems. These procedures are part of the known state of the art, and have been used, among other places in the field of robotics for creating 3D models using, for example, SLAM (Simultaneous Localization And Mapping).

The system either takes perspectively accurate images from the 3D model or transforms the raw images by appropriate projective transformations, as is well known in the art. Color and resolutions are converted to render consistently to the at-home user even if different sensor inputs provide variations. For example, if it is detected that given images are taken, some in sunlight and some in shadow, these images are rendered consistently per the at-home user's virtual perspective—i.e. is the virtual perspective of the user one in which s/he will be in the sun or shadow (or somewhere in between—in which case an interpolation is required).

Resolution conversions can be achieved by extrapolation or interpolation, as is well known in the art, so that image data is consistent for the at-home user regardless of the resolutions of each camera participating in the ad hoc cluster of sensors. Such color/resolution parameters could be at least partially controlled by one or more menu settings on the at-home user's device. The system also renders the audio input by estimating distance from source at different frequencies and rendering a volume-wise consistent surround sound experience for the at-home user.

As demonstrated by the four exemplary scenarios, in the present invention, the at-home user can either pick the same location as the on-the-go user for their virtual location during a session or can pick some location relative to that on-the-go user, for example, three feet to one side of the on-the-go user. The system streams personalized sensory data based on the at-home user's virtual location in the scene and the location of the at-home user's rendering devices (e.g., their monitors and speaker) relative to where the at-home user is situated in the room.

From this description above, it should be clear that present invention expands the ad hoc network concept into a new and different use, based on sensors that have capacity to identify with their geo-location. The present invention potentially accommodates any conventional output devices, and does not require specialized glasses or goggles, although specialized devices could add to the user's experience.

The present invention also identifies cameras from different systems, if necessary, that are available for visualization and groups them in different types of resolution and networking capabilities and then creates an ad hoc network using those cameras. The ad hoc network is updated as some of the cameras or visual sensors move into the network and as some of them move out of the system.

As briefly mentioned, the present invention also incorporates a learning feature that, via statistical methods, automatically detects and accommodates the at-home user's special visual or auditory needs (e.g. peripheral vision enhancement), or to increase the viewer's comfort, since each user may have their own personal needs and quirks regarding eyesight and/or other bodily constraints. Such a feature could be as simple as a memory that stores users' previous preferences or, in a preferred embodiment, could involve a learning algorithm.

For example, users with glasses generally cannot see well using peripheral vision since that part of their vision is not benefitting from the glasses. Using cameras or other sensors in the at-home user's environment, the system of this invention can detect that a user is wearing glasses or, conceivably, that the user has some other visual deficiency and can accommodate accordingly by, for example, magnifying output in the deficient portion of the user's field of view. Other users may be near sighted and are not using any adjustments such as glasses during the participation, and the present invention can use higher resolution for the near field than used for outside the near field region. Other exemplary adjustments might be for other personal needs such as neck and/or face movements or for users who are colorblind or otherwise not sensitive to change in color. Users with such color impairments may not need color rendering.

Another feature provided by the present invention is that of auctioning service to different users, based on the user's different needs for image/audio quality and/or the constraint of limited bandwidth, etc. Such a feature could be implemented as a menu selection on an associated application or app. Alternatively, users could subscribe for different tiered service levels based on each user's image/audio quality needs or preferences.

Yet another feature of the present invention is that it can learn how to accommodate network bottlenecks given the types and number of screens and speakers present for rendering, and the relative CPU/memory available in the ad hoc network versus the "at-home" computing system. In some cases it may be more efficient to transmit a complete 3D model (which requires more memory and a network with good throughput, but gives the most robust rendering if the at-home user is entitled to move around in the scene), in other cases, untransformed images (requiring less memory and bandwidth) may be preferable, and in others still, the final, transformed images.

In an exemplary embodiment, the system can also be modified to store renderings/recordings from past viewing sessions and learn what image properties constitute "similarity", perhaps by using user feedback. Thus, in scenarios in which a camera is unavailable and creates a "hole" in the teleported image, the system can replace the missing feed with historical footage from the same location, time of day, season, weather forecast, etc. to fill in the blank.

Figure 3:
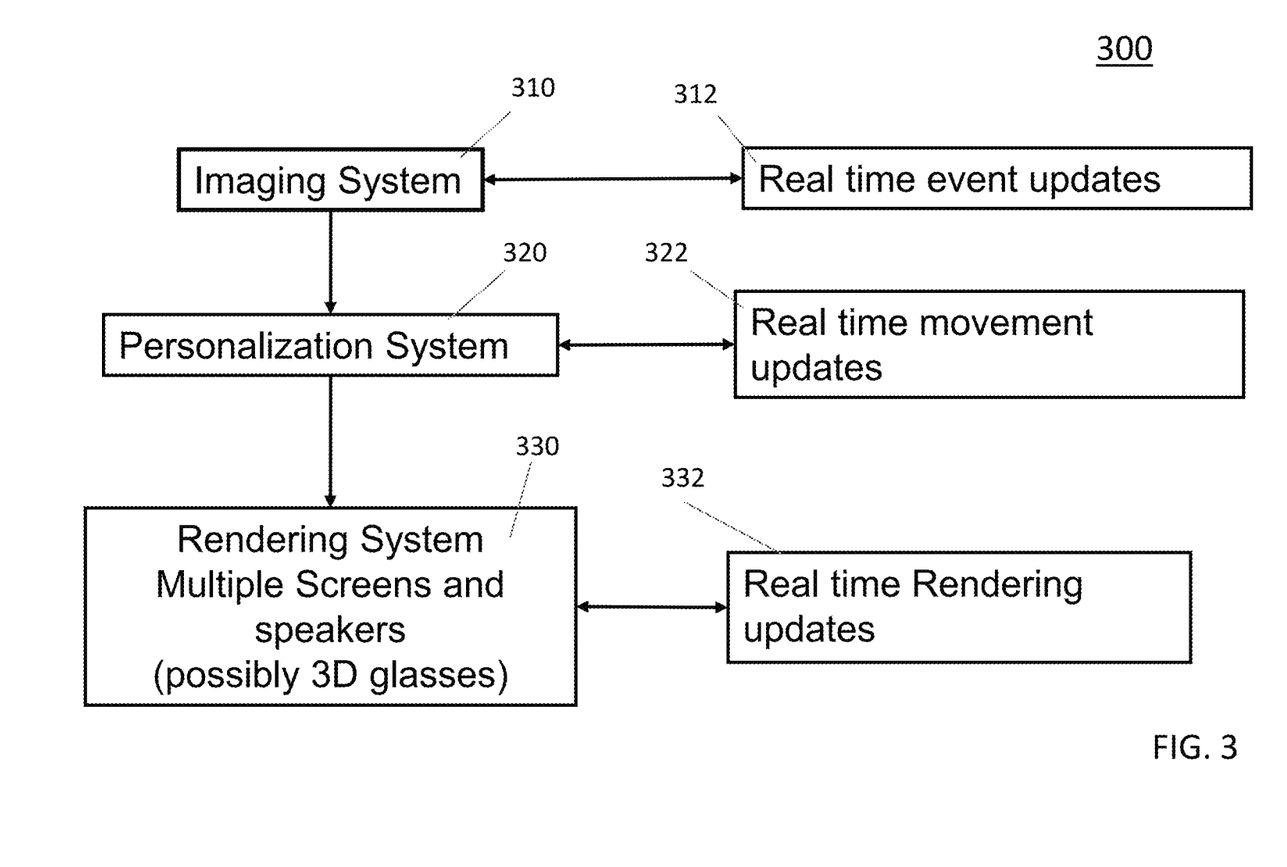
FIG. 3 shows an exemplary block diagram 300 of primary components of the present invention.

FIG. 3 shows exemplarily primary subsystems 300 that explain how the system works.

Imaging system 310 captures sound, images and video from an ad-hoc collection of surrounding input devices as captured by an on-the-go user. The imaging system 310 also identifies cameras from different systems that are available for visualization and groups them into different categories and types based on characterizations such as resolution and networking capabilities. The imaging system also creates an ad hoc network of a cluster of these cameras. The ad hoc network is updated 312 as some of the cameras, visual sensors, and/or microphones move into range of the current network and as some sensors move outside the range. Some regions of the physical environment may be thinly or inadequately covered by audio or visual sensors, possibly creating perceivable gaps in the image from the viewer's perspective.

These gaps can be detected computationally by determining the resolution as well as pixel value updates from the sensors, if such perceivable gaps exist. In these cases the visual signal may be interpolated from the closest known points using traditional image interpolation algorithms such as described in an article "Understanding image-interpolation techniques" by Vision Systems Design. Alternatively, if the pixels in the neighborhood of the gap can be determined to contain a periodic pattern, then the same pattern can be continued for filling up the gap in the image. Analogously the audio signal can be interpolated from known points, or if sources can be identified (or approximated) then the associated sounds can be extended to the uncovered region using an inverse distance squared diminution.

Personalization system 320 provides real-time movements 322 of the at-home user within the data space. The personalization system 320 also learns an "at-home" user's audio/visual processing limitations, quirks, and preferences. For example, every user may have their own personal needs and quirks regarding their eyes and/or other bodily constraints. Users with glasses, for example, generally cannot see well using their peripheral vision, since that part of their vision is not benefiting from the glasses. The personalization system 320 can detect that a user is wearing glasses, has a particular visual deficiency, and accommodate accordingly, for example, by magnifying output in that portion of their field of view not covered by their glasses.

For near-sighted users that are not using any adjustments such as glasses during the session, the personalization system 320 can provide higher resolution for near-field pixels that for outside pixels. Users who are colorblind or not sensitive to change in colors may similarly not need color rendering. Additionally, an auction can be created by the personalization system 320 based on users' need for image/audio quality and the constraint of limited bandwidth, etc. Alternatively, a subscription model could be created by the personalization system, with tiered service levels based on users' image and audio quality needs. The auction/subscription features would be available to the at-home user as based on a menu of potential options, similar to other options for which the at-home user could have settings.

Rendering system 330 provides real-time rendering updates 332 of data from the imaging system 310. The rendering system can also connect with available output devices of the at-home user to set up the at-home user output devices for the session, such a multiple speakers and displays, that would provide better immersion of the data. The rendering system 330 faithfully renders the 3D experience in sound and video as it was received, while simultaneously tailoring delivery to accommodate the user's needs as per the dictates of the personalization system 320. The rendering system 330 can also learn how to accommodate network bottlenecks given the types and number of screens and speakers present for rendering, and the relative CPU/memory available in the ad hoc network versus the at-home computing system. In some cases it might be more efficient to transmit a 3D model, in other cases, it might be more efficient to transmit the untransformed images, and in others still, it might be more efficient to transmit the final, transformed images.

Such decisions could be based on monitoring time lags between receipt of sensor data at the on-the-go device and the presentation of video/audio data at the at-home speakers/displays. For example, if there is a single at-home user device during a session, then different computations could be re-allocated between the at-home user device and the on-the-go user device. Another possible efficiency mechanism, given a single at-home user device, would be the reduction in sensor data transmitted to the at-home user device by having the at-home user's location and viewing perspective transmitted to the on-the-go user device, so that the on-the-go user device could select data from only appropriate sensors for that location/viewing perspective, thereby reducing the data bandwidth requirements.

Figure 4:
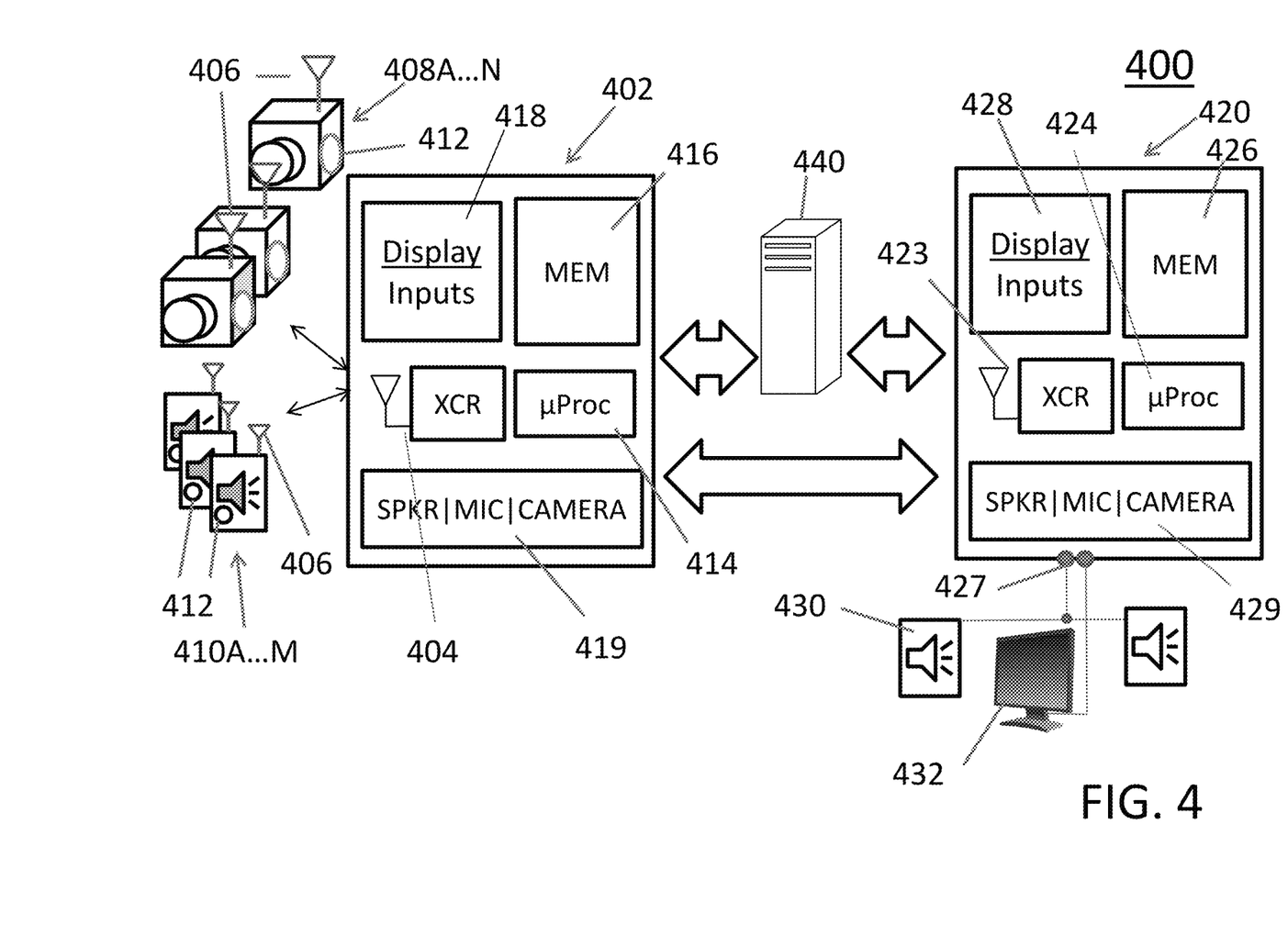
FIG. 4 exemplarily shows hardware components 400 for various embodiments.

FIG. 4 demonstrates exemplary hardware components 400 upon which different embodiments of the present invention could be implemented. The on-the-go user's device 402 includes a wireless transceiver/antenna 404 that permits wireless communication with antenna/transceiver modules 406 respectively located in cameras 408A-408N and microphones 410A-410M, along with a chip or module 412 in each sensor 408/410 which permits the on-the-go-device 402 to establish an ad hoc network with these local sensors 408/410 and to transmit its sensor data to the on-the-go user device 402. Although only three cameras 408 and three microphones 410 are exemplarily shown in FIG. 4, it should be clear than such numbers are exemplary since there could be fewer or more of each sensor type.

On-the-go device 402 also includes a microprocessor 414 to execute instructions related to the formation and maintenance of the ad hoc network cluster and other on-the-go functions including possibly data processing operations Memory 416 to stores instructions being executed, and a display panel/user interface 418 permits the on-the-go user to display menu items related to the ad hoc session and to input command or setting choices via, for example, a keyboard panel. On-the-go user device 402 could also include a camera/microphone/speaker 419 permitting the on-the-go device to potentially serve as one of the sensors and to hear the voice of the at-home user during the session.

In an exemplary embodiment, data from the ad hoc sensors are received at the antenna/transceiver 404 on the on-the-go device 402, to be then forwarded to the at-home user's device 420 for additional processing for viewing. This ad hoc sensor data could be forwarded via the processor 414 on the on-the-go device, or a bypass mechanism, such as a bypass switch mechanism or direct memory access (DMA) mechanism could permit the on-the-go user device 402 to forward the data to the at-home device 420 without using processor 414 resources on the on-the-go device 402. For example processor 414 could be used to select which sensor data is to be forwarded to the at-home user if there is a single at-home user and the at-home user's desired location and viewing perspective is provided to the on-the-go user's device 402.

The at-home user device 420 similarly includes microprocessor 424, memory 426, user I/O devices 428 including possibly a display panel and keyboard or other user input devices, and microphone/camera/speaker 429 modules such that the microphone and speaker permit the at-home user to communicate with the on-the-go user and to hear audio from the microphone sensors at the on-the-go user end. The at-home user device 420 could also have I/O ports 427 for one or more speakers 430 and/or displays 432 so that the at-home user could use a more extensive set of displays/goggles/glasses and/or speakers/headphones, etc. The at-home user device 420 could also include antenna/transceiver 423 but may not utilize them during a virtual teleporter session.

The keyboard or other input devices 428 on the at-home user device 420 would also permit the at-home user to interact with a menu related to the at-home functions, such as permitting the at-home user to define a location and viewing perspective in the received data. Other mechanisms to permit the at-home user to move about in the received data could include sensors at the at-home user location that permits eye motion and/or body motions to be detected, such that the at-home user's device can automatically detect the at-home user's desired location and viewing perspective relative to the audio/video data streaming in from the on-the-go ad hoc sensor network.

As demonstrated by the first scenario, both the on-the-go user device 402 and the at-home user device 420 could be smart phones each having an app that implements the present invention, possibly as stored in memory 416, 426, or as downloaded from a computer 440, for example a server on the Internet, for purpose of conducting a virtual teleporter session. Computer/server 440 could also be located in the cloud, such that the present invention could be implemented as a cloud service.

In the case of the first exemplary scenario, the husband on-the-go user in Paris could have established a telephone call to his wife in New York, and they agree to engage the app for the virtual teleporter session as an adjunct to their existing telephone call, possibly using the same communication channel for data for the virtual teleporter session. Alternatively, the virtual teleporter system could institute a separate data channel for its session data.

In the case of the second exemplary scenario, the combatant on-the-go user could be using a smart phone device or a specialized smart device carried in a pocket or backpack, with his at-home-user familiar with tropical warfare being located states' side and using a smart phone.

In the case of the third exemplary scenario, the on-the-go device could be a smart phone carried by an agent of the organizer, as located in a seat in the sports stadium, and serving to establish an ad hoc session for a number of clients listening in and viewing individual sessions through their smart phones or even a home computer. Alternatively, the on-the-go user device in the sports event scenario could be one or more on-the-go devices mounted somewhere in the stadium such as to have wireless contact with multiple sensors located throughout the stadium.

In the case of the fourth exemplary scenario, the skier/climber on-the-go user could be using a smart phone device or a specialized smart device carried in a pocket or backpack by the skier or mountain climber, capable of establishing an ad hoc network with the different cameras and/or microphones being carried or worn on a garment. Although it might be possible to communicate via a satellite or other wireless manner with the skier/climber, an alternative to real time communication with an at-home user in this scenario would be that of recording the session in a memory device of the skier/climber on-the-go user.

Computer/server 440 could also serve additional roles in the present invention in addition to serving as a repository for an application program that could be downloaded onto smart devices for purpose of implementing a virtual teleporter session. For example, a computer 440 could remotely store the data of a virtual teleporter session, such as the sports event or the skier/climber scenarios described above. Such recording would permit future viewing of the session, including, for example, re-runs of the sporting event in which each at-home user would be able to choose and change their own perspective of the event for each re-run.

Computer/server 440 could also serve as a memory for historical images from previous virtual teleporter sessions using specific cameras, as then used to fill in possible gaps on future sessions. Computer/server 440 could also serve to store a registry of sensors at specific locations that could be utilized for teleporter sessions at those locations, including possibly whether the location has a registered "on-the-go" device that can serve to set up a session by an at-home user without having an actual person present with their personal on-the-go user device.

Figure 5:
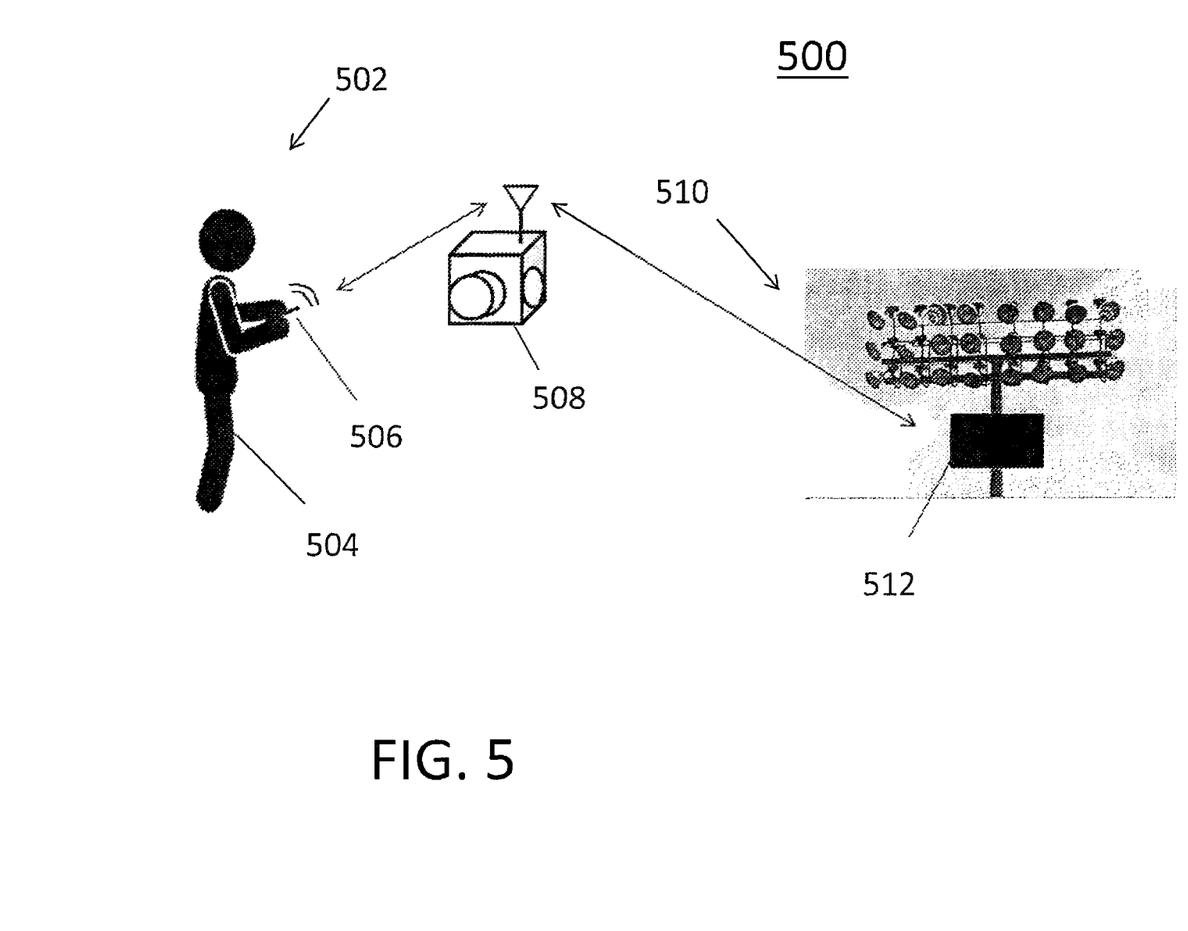
FIG. 5 shows two different alternative embodiments 500 for possible different on-the-go mechanisms for setting up an ad hoc network of sensors.

FIG. 5 shows two exemplary possibilities 500 for the on-the-go user role. In a first exemplary embodiment 502, the on-the-go user role is satisfied by an actual person 504 carrying a portable device 506 such as a smart phone or notepad, or other computer-based device. The smart phone 506 has loaded thereon an app or application program that permits the smart phone 506 to transmit a peer-to-peer request to any sensor with range to create the ad hoc network to be used for a virtual teleporter session. For example, the on-the-go user's smart phone 506 may participate as being one of the sensors included in the ad hoc network. Data from the ad hoc sensors 508 could be received into the teleporter session via the user portable device 506 or could be received via another communications port located somewhere within a link range of the ad hoc network.

This first embodiment 502 of the on-the-go user would potentially service any of the four exemplary scenarios described above.

In a second exemplary embodiment 510, the on-the-go user role is provided by a stationary or semi-stationary on-the-go user device 512 that serves as a means to create an ad hoc network of sensors 508 at that fixed location. For example, a popular destination, such as Paris, might well find it advantageous to set up a stationary device 512 that could be contacted for purpose of setting up an ad hoc group of sensors within link range of the stationary "on-the-go user" device 512, so that remote at-home viewers could conduct virtual teleporter sessions at that location by merely contacting the stationary "on-the-go user" device 512.

This embodiment could well service not only the first scenario in Paris but also the sporting event scenario in which a sports arena is filled with sensors that can be formed into an ad hoc network via one or more stationary devices 512. There are many other scenarios where a stationary or semi-stationary device 512 might be useful, including as non-limiting examples, a cruise ship, national parks, and popular tourist locations that are made accessible to at-home users. In such embodiments, a network server 440 (FIG. 4) could serve as a repository that provides information of locations having such on-the-go device capabilities.

As a modification of the second embodiment 510, hardware that serves the on-the-go role, including an antenna/transceiver and a processor that provides instructions for that sensor/on-the-go hardware to form an ad hoc network with other sensors within link range and an interface to communicate on demand with at-home user devices. Such combined sensor/on-the-go hardware could be fixed or could be mounted on a mobile platform. At-home users could contact the combined sensor/on-the-go hardware by, for example, consulting a registry of such combined hardware sensors, similar to consulting a database registry for fixed on-the-go devices of the second embodiment 510 described above.

Exemplary Hardware Aspects, Using a Cloud Computing Environment

It is understood in advance that, although this section of the disclosure provides a detailed description on cloud computing, implementation of the teachings recited herein are not limited to a cloud computing environment. Rather, embodiments of the present invention are capable of being implemented in conjunction with any other types of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
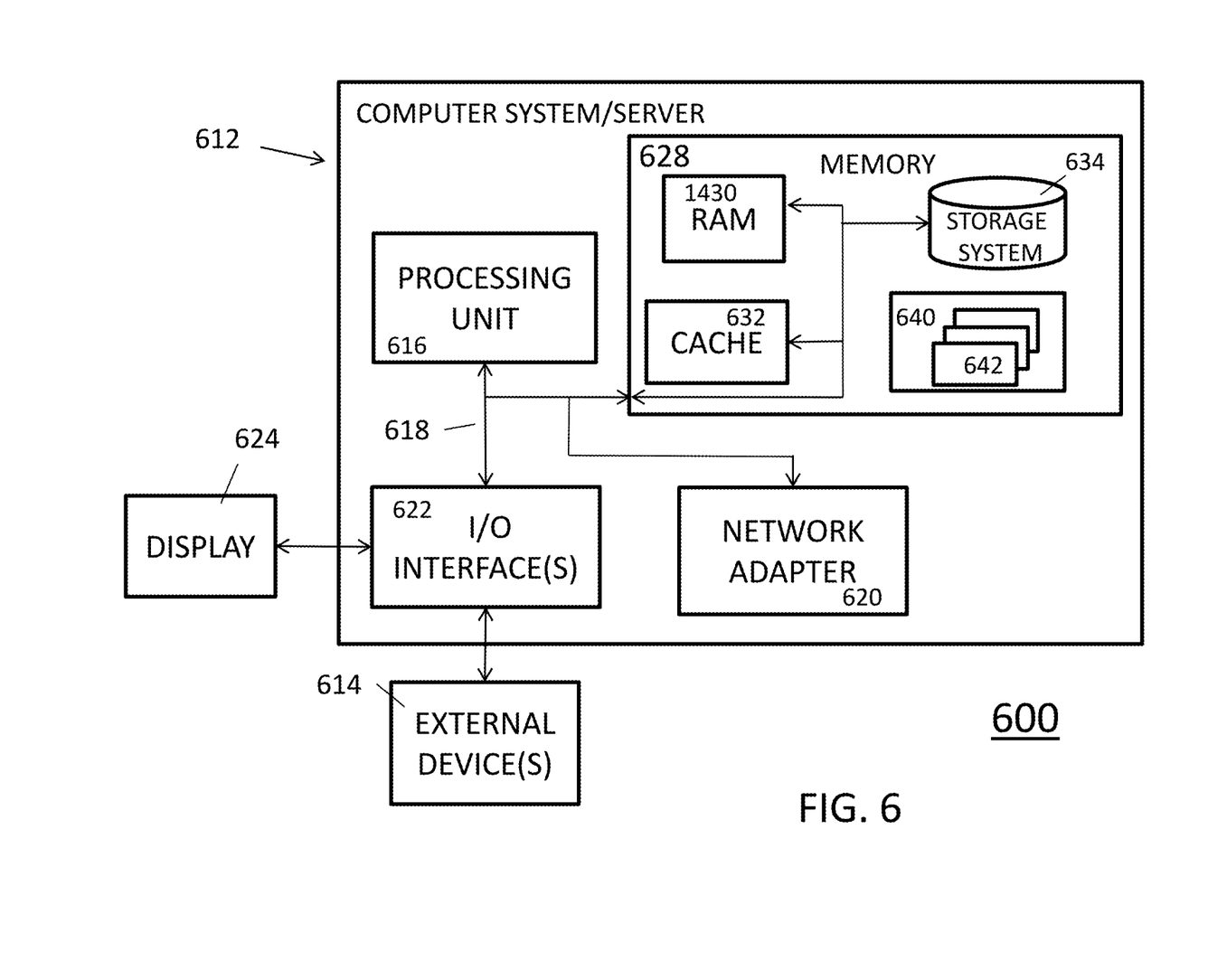
FIG. 6 depicts a cloud computing node 600 according to an exemplary embodiment of the present invention.

Referring now to FIG. 6, a schematic 600 of an example of a cloud computing node is shown. Cloud computing node 600 is only one example of a suitable cloud computing node and is not intended to suggest any limitation as to the scope of use or functionality of embodiments of the invention described herein. Regardless, cloud computing node 600 is capable of being implemented and/or performing any of the functionality set forth hereinabove.

In cloud computing node 600 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in cloud computing node 600 is shown in the form of a general-purpose computing device. The components of computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 1234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

Figure 7:
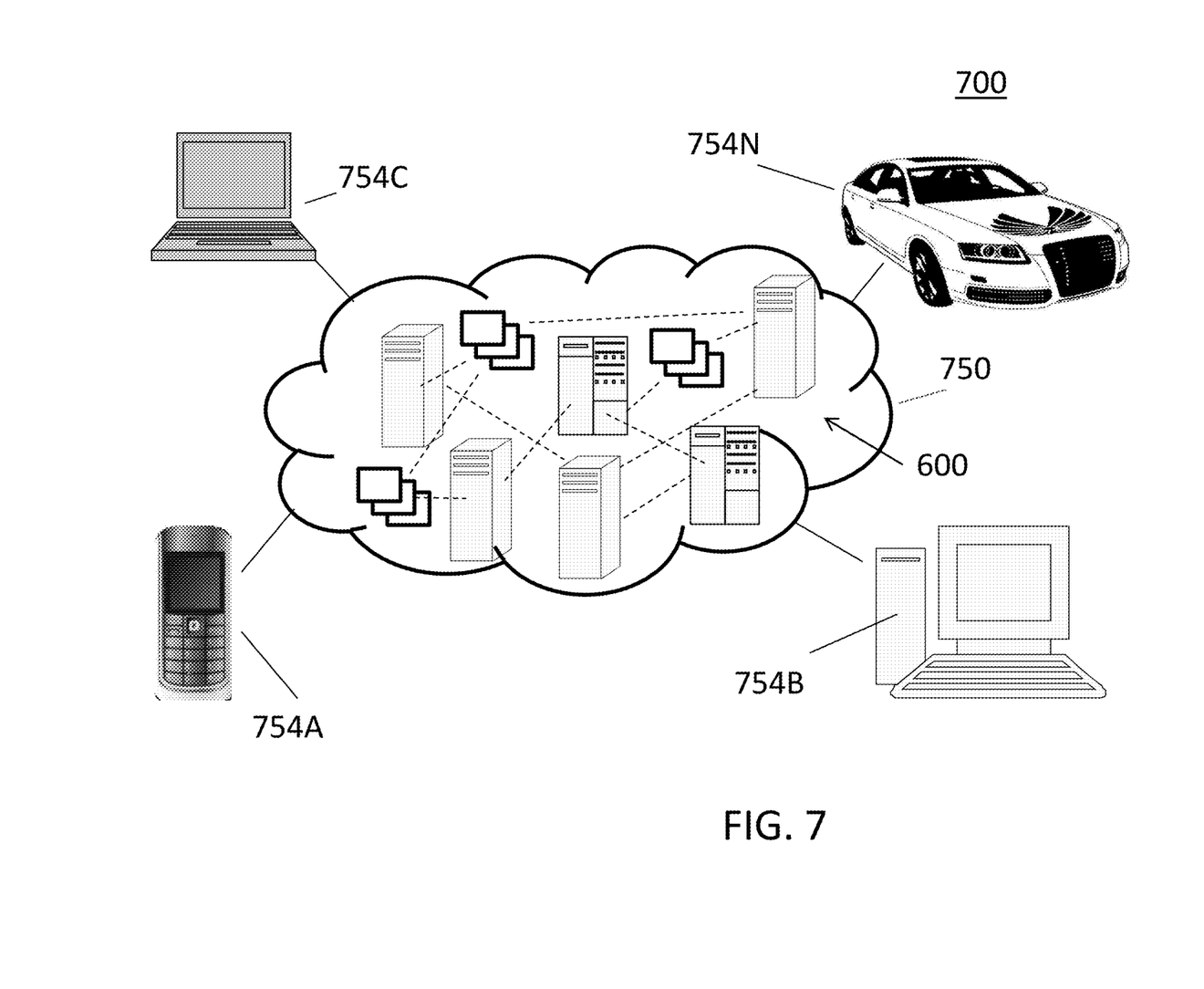
FIG. 7 depicts a cloud computing environment 700 according to an exemplary embodiment of the present invention.

Referring now to FIG. 7, an illustrative cloud computing environment 750 is depicted. As shown, cloud computing environment 750 comprises one or more cloud computing nodes 600 with which local computing devices used by cloud consumers, such as, for example, personal digital assistant (PDA) or cellular telephone 754A, desktop computer 754B, laptop computer 754C, and/or automobile computer system 754N may communicate. Nodes 720 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 600 and cloud computing environment 750 can communicate with any type of computerized device over any type of network and/or network addressable connection (e.g., using a web browser).

Figure 8:
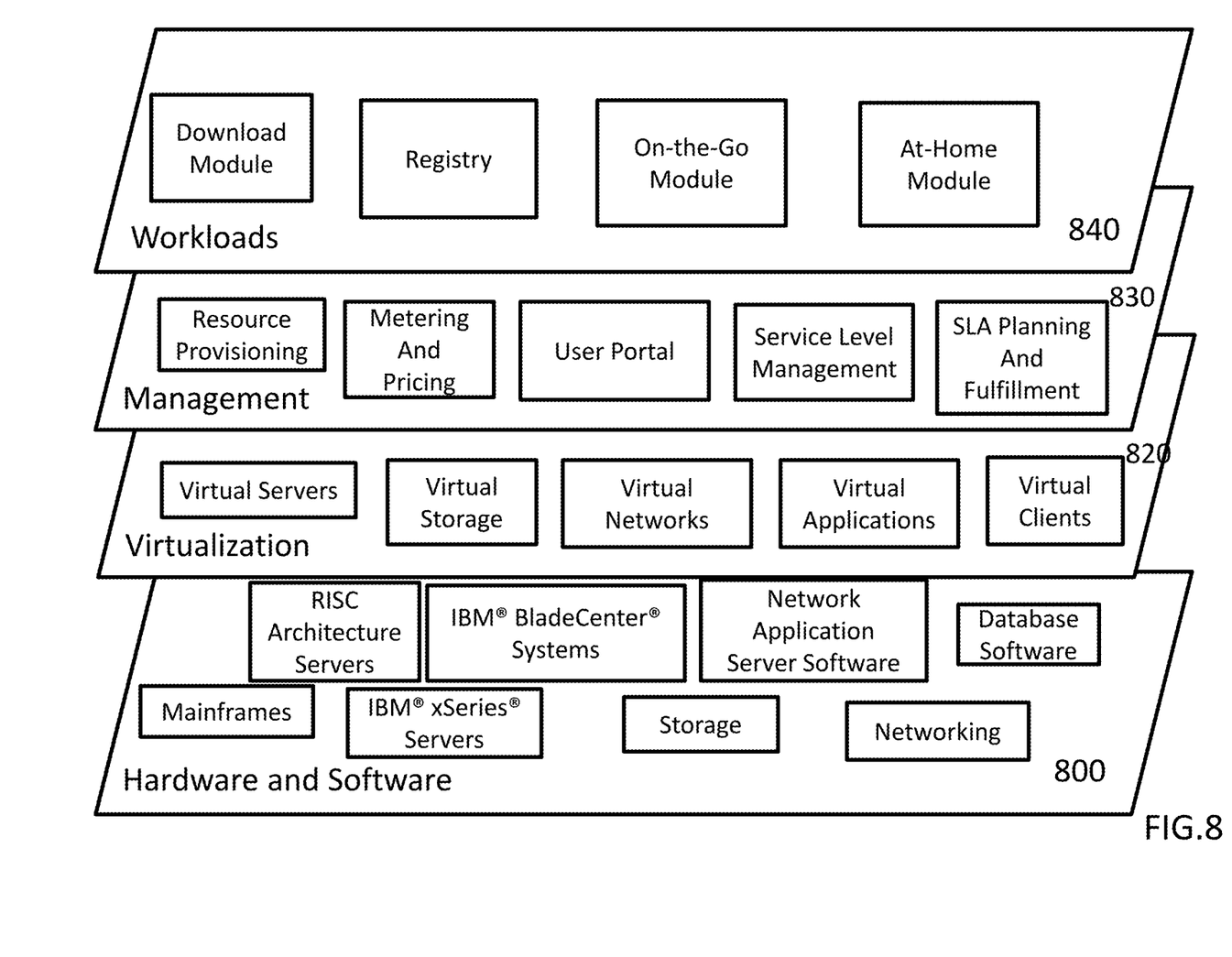
FIG. 8 depicts abstraction model layers 800-840 according to an exemplary embodiment of the present invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 800 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide). The tooling that implements the present invention would be located in layer 800.

Virtualization layer 820 provides an abstraction layer from which the following examples of virtual entities may be provided: virtual servers; virtual storage; virtual networks, including virtual private networks; virtual applications and operating systems; and virtual clients. The virtual machines and network appliances that are generated and instantiated by the tooling of the present invention would operate on layer 820.

In one example, management layer 830 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment module provides pre-arrangement for, and procurement of, cloud computing resources for which a future requirement is anticipated in accordance with an SLA.

Workloads layer 840 provides examples of functionality for which the cloud computing environment may be utilized. Examples of workloads and functions which may be provided from this layer might include any number of functions and applications, including some not even related to the present invention. Examples of workloads and functions related to the present invention might include such functions as the capability to download a virtual teleporter application program on demand as a cloud service, the capability to identify registered sensors and/or registered stationary on-the-go user device(s) at different registered locations, and the capability of executing data processing for the at-home display functions or on-the-go role functions as a cloud service.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus, comprising:
a processor;
a memory device accessible by the processor;
a transceiver; and
circuitry to selectively communicate with one or more sensors within a link range of the transceiver and to selectively communicate with a home device located at a location different from a location of the apparatus,
wherein the memory device stores instructions to permit the apparatus to selectively serve as a mobile device that establishes and maintains a wireless ad hoc network with the one or more sensors located within the link range of the transceiver, data from the sensors of the wireless ad hoc network providing data for consumption by the home device to permit an immersion experience of the location of the mobile device.

2. The apparatus of claim 1, as comprising a processor-based smart mobile device serving as the mobile device carried by or associated with a mobile user.

3. The apparatus of claim 1, wherein the one or more sensors comprise any of:
one or more video cameras respectively mounted in fixed locations in a vicinity of the mobile device and within the link range of the transceiver;
one or more microphones respectively mounted in the vicinity of the mobile device within the link range of the transceiver;
one or more of a video camera and/or microphone mounted on the on the go user mobile device;
one or more of video cameras and/or microphones mounted on one or more articles worn or carried by a mobile user; and
one or more video cameras and/or microphones mounted on one or more mobile platforms in the vicinity of the mobile device within the link range of the transceiver.

4. The apparatus of claim 1, wherein the wireless ad hoc network is established and maintained by a transceiver on the mobile device that transmits a pulse such that any sensor in the link range capable of recognizing the transmitted pulse is invited to join the wireless ad hoc network and wherein each sensor providing data for the ad hoc network provides an indication of its precise location and directional orientation of its output data.

5. The apparatus of claim 4, wherein the mobile user can selectively change location and the link range permits sensors of the wireless ad hoc network to be added and deleted based on movements of the mobile user, based upon being within the link range of the transceiver.

6. The apparatus of claim 4, wherein the location and directional orientation information of the sensors in the wireless ad hoc network permits a three-dimensional model to be constructed using sensory data of the wireless ad hoc network.

7. The apparatus of claim 4, wherein the location and directional orientation information of the sensors in the wireless ad hoc network permits a home user to select a location and direction to view from the sensor data.

8. The apparatus of claim 1, wherein data from the sensors comprising the wireless ad hoc network is received via the transceiver and is forwarded to the home device.

9. The apparatus of claim 1, wherein data from the sensors comprising the wireless ad hoc network is received by the transceiver and is stored in a memory device of the device or associated with the mobile device, to be selectively replayed in the future.

10. The apparatus of claim 1, wherein, upon communicating with the sensors within the link range, the apparatus categorizes the sensors based on at least one of a resolution and a networking capability of the sensors.

11. A system including the apparatus of claim 1, further comprising:
a server; and
the apparatus communicating with the server, wherein the mobile device and the home device are interconnected via an audio channel, permitting a real-time conversation between the mobile user and a home user.

12. An apparatus, comprising:
a processor;
a memory device accessible by the processor; and
circuitry to selectively communicate with a mobile device located at a location different from a location of the apparatus,
wherein the memory device stores instructions to permit the apparatus to selectively serve as a home device that receives data from a wireless ad hoc network formed by sensors located within a link range of the circuitry of the user mobile device, data from the sensors of the wireless ad hoc network providing data for consumption by the home device to permit to be immersed in an experience of the location of the mobile device.

13. The apparatus of claim 12, as comprising a processor-based smart mobile device serving as the home device.

14. The apparatus of claim 12, wherein a home user can selectively engage in a real-time conversation between the mobile user and the home user.

15. The apparatus of claim 12, wherein the home user can selectively engage in an experience of the mobile user via data stored and retrieved from a memory device in or associated with the mobile device.

16. The apparatus of claim 12, as further comprising a capability for a home user to select a location and a viewing direction from the data of the wireless ad hoc network.

17. A method, comprising:
establishing and maintaining, by a mobile device located at a first location, an ad hoc network of sensors located within a link range of the mobile device; and
providing data from the ad hoc network of sensors for consumption by a home device located at a second location different from the first location, to permit to be immersed in an experience of the first location.

18. The method of claim 17, wherein the mobile device comprises a processor-based smart mobile device.

19. The method of claim 17, wherein sensors of the ad hoc network each respectively provides a precise location and an indication of directional orientation of its output data.

20. The method of claim 19, wherein the location and directional orientation information of the sensors in the wireless ad hoc network permits a three-dimensional model to be constructed using the sensory data, permitting a selection of a location and direction to view from within the three-dimensional model.

* * * * *